US012432476B2

(12) United States Patent
Barthelmann et al.

(10) Patent No.: US 12,432,476 B2
(45) Date of Patent: Sep. 30, 2025

(54) INSTALLATION ASSEMBLY FOR A LOUDSPEAKER IN A MOTOR VEHICLE

(71) Applicant: Brose Fahrzeugteile SE & Co. Kommanditgesellschaft, Bamberg, Bamberg (DE)

(72) Inventors: Philipp Barthelmann, Pfarrweisach (DE); Mathias Kasum, Litzendorf (DE); Timo Kirchner, Bamberg (DE); Rainer Kroack, Breitengüssbach (DE); Joachim Müller, Werneck (DE); Ulrich Reitz, Weidhausen (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 203 days.

(21) Appl. No.: 18/466,150

(22) Filed: Sep. 13, 2023

(65) Prior Publication Data

US 2023/0421936 A1 Dec. 28, 2023

Related U.S. Application Data

(63) Continuation of application No. PCT/EP2022/054553, filed on Feb. 23, 2022.

(30) Foreign Application Priority Data

Mar. 15, 2021 (DE) ..................... 10 2021 202 513.7

(51) Int. Cl.
*H04R 1/02* (2006.01)

(52) U.S. Cl.
CPC .......... *H04R 1/025* (2013.01); *H04R 2400/11* (2013.01); *H04R 2499/13* (2013.01)

(58) Field of Classification Search
CPC . H04R 1/025; H04R 2400/11; H04R 2499/13
USPC ............................................................ 381/86
See application file for complete search history.

(56) References Cited

U.S. PATENT DOCUMENTS

| | | | | |
|---|---|---|---|---|
| 6,457,547 | B2 | 10/2002 | Novitschitsch | |
| 2004/0062407 | A1 | 4/2004 | Ziegler et al. | |
| 2008/0137899 | A1 * | 6/2008 | Campbell, Jr. ........ | H04R 1/025 381/386 |

FOREIGN PATENT DOCUMENTS

| | | | |
|---|---|---|---|
| DE | 19925944 | A1 | 1/2001 |
| DE | 19957938 | A1 | 6/2001 |
| DE | 10256970 | A1 | 6/2004 |
| DE | 202005014602 | U1 | 2/2007 |

(Continued)

*Primary Examiner* — Sean H Nguyen

(74) *Attorney, Agent, or Firm* — Laurence A. Greenberg; Werner H. Stemer; Ralph E. Locher

(57) ABSTRACT

An installation assembly for a loudspeaker, in particular in a vehicle door, contains a support element having a receiving opening for the loudspeaker, a loudspeaker basket having a flange, and a sealing element in the region of a mechanical abutment interface between the loudspeaker basket and the support element. During installation, the loudspeaker extends through the receiving opening on the support side, and the flange on the basket side abuts the support element with the interposition of the sealing element. The loudspeaker basket has a number of joining elements which correspond to joining contours of the support element to produce a bayonet coupling or a push-and-turn connection.

20 Claims, 10 Drawing Sheets

(56) References Cited

FOREIGN PATENT DOCUMENTS

| | | | |
|---|---|---|---|
| DE | 202005014605 | U1 | 2/2007 |
| DE | 10144665 | B4 | 5/2007 |

* cited by examiner

INSTALLATION ASSEMBLY FOR A LOUDSPEAKER IN A MOTOR VEHICLE

CROSS-REFERENCE TO RELATED APPLICATION

This application is a continuation, under 35 U.S.C. § 120, of copending International Patent Application PCT/EP2022/054553, filed Feb. 23, 2022, which designated the United States; this application also claims the priority, under 35 U.S.C. § 119, of German Patent Application DE 10 2021 202 513.7, filed Mar. 15, 2021; the prior applications are herewith incorporated by reference in their entirety.

FIELD AND BACKGROUND OF THE INVENTION

The invention relates to an assembly configuration of a loudspeaker in a motor vehicle, for example, in a vehicle door. The invention particularly relates to a preferably bayonet-closure-like assembly configuration of a loudspeaker on a carrier element of the motor vehicle.

German patent DE 101 44 665 B4 discloses a vehicle door with an internal door metal sheet as a wall, to which a loudspeaker is fixed. The wall has a receiving opening, in which the loudspeaker is inserted and fixed to the wall by means of screws, rivets or the like. In a lower portion of the loudspeaker and at that location inside the loudspeaker basket thereof and under a fixing axis at that location, a water discharge is provided in a wet space which is separated by means of the wall from a dry space of the vehicle door.

German utility model DE 20 2005 014 605 U1 discloses a vehicle door having a wall which faces the inner space of the vehicle and which has a receiving opening for a loudspeaker. In the region of the receiving opening or on the loudspeaker, there are provided integral fixing means which form together with receiving means a plug-type connection which is in the form of a snap-fit or clip-fit connection, a bayonet closure or a threaded connection.

SUMMARY OF THE INVENTION

An object of the invention is to provide a particularly suitable assembly configuration or assembly apparatus for a loudspeaker of a motor vehicle, in particular in a vehicle door of the motor vehicle. In particular, the loudspeaker should be able to be mounted as easily as possible, preferably also while avoiding assembly errors (poka-yoke), securely on a carrier element (basic carrier), particularly as a wall for the loudspeaker or the loudspeaker basket thereof or generally the loudspeaker housing thereof, particularly preferably without additional fixing means, such as, for example, fixing screws, rivets, a fixing ring or the like being necessary. Furthermore, a particularly suitable door module having such an assembly configuration is intended to be provided.

With regard to the assembly configuration, the mentioned object is achieved according to the invention with the features of the claim and with regard to the door module with the features of the independent claim. Advantageous embodiments and further developments are set out in the dependent claims (subordinate claims).

With the foregoing and other objects in view there is provided, in accordance with the invention, an assembly configuration of a loudspeaker in a motor vehicle. The assembly configuration contains a carrier element having a receiving opening surrounded by an opening edge for the loudspeaker, the carrier element further has a plurality of joining contours. A loudspeaker basket having a flange, wall struts, a basket base and at least one ramp is provided. A sealing element is disposed in a region of a mechanical abutment interface between the loudspeaker basket and the opening edge surrounding the receiving opening. The loudspeaker basket engages during assembly on the carrier element through the receiving opening in the carrier element, and the flange of the loudspeaker basket abuts against the opening edge surrounding the receiving opening with the sealing element being interposed. The loudspeaker basket has a plurality of joining elements corresponding to the joining contours of the carrier element in order to produce a bayonet closure. The at least one ramp extends in a circumferential direction of the flange on the loudspeaker basket, the at least one ramp is disposed on the flange of the loudspeaker basket on a flange side facing the opening edge surrounding the receiving opening in the carrier element, in order to produce a pressing force on the sealing element.

The assembly configuration or assembly apparatus of a loudspeaker or for a loudspeaker of a motor vehicle, in particular in a vehicle door, has a carrier element having a receiving opening which is surrounded by an opening edge for the loudspeaker. The carrier element is preferably used as a basic carrier and is advantageously a component or an integral component of a carrier plate which is fitted in a vehicle door (door module carrier plate) or a plate-like door module carrier which is, for example, in the form of a plastics component, and which is used in a suitable manner for separation between a wet space and a dry space of the vehicle door, or a component which can be connected to an internal door metal sheet. The carrier element can also act as an acoustic baffle for the loudspeaker and the receiving opening can also be an acoustic baffle opening.

The term "assembly configuration or apparatus" is also intended to be understood to be a fixing structure for retaining a loudspeaker on a basic carrier or door module carrier (unit or component carrier) of a motor vehicle door, in particular of a door module or for such a door module.

The term "loudspeaker" is intended to be understood here and below to be a sound converter, in particular according to the dynamic coil principle (dynamic coil loudspeaker), having a membrane and having a drive unit and having connection elements. In particular, the loudspeaker has a loudspeaker basket, a membrane (loudspeaker membrane), a bead (rubber bead), a centering spider, an oscillation coil and a permanent magnet. The membrane is typically connected by means of the bead to a flange and via the spider to wall or basket struts which extend, for example, conically in the region of the basket base of the loudspeaker basket. The membrane is driven by the centrally arranged oscillation coil which vibrates in the magnetic field of the permanent magnet which is arranged on the basket base so that the membrane is moved and in this case guided by the spider. In particular, the loudspeaker is a woofer loudspeaker or a mid-range loudspeaker having a basket flange diameter of, for example, from 12 cm to 15 cm, and having a frequency response of in particular from 40 Hz or 200 Hz to 2 kHz.

The receiving opening in the carrier is configured, for example, in a cup-like manner or conically, in particular having a drawn-in or deep-drawn wall. The term "receiving opening in the carrier" is intended to be understood here and below to mean that the receiving opening is a component of the carrier element.

The assembly configuration or assembly apparatus further has a loudspeaker basket having a flange and having wall struts or basket struts between the flange and a basket base. The basket struts form a basket wall which is preferably interrupted in a circumferential direction of the loudspeaker basket and which is therefore not closed or at least not completely closed at the circumference. With respect to a preferably circular-ring-like flange and a receiving opening which is circular at the carrier side and an axis which is normal relative thereto, the basket struts can extend from the flange to the basket base at an inclination angle, wherein the basket base can be axially offset relative to the rear side of the flange (flange rear side) which acts as a mechanical abutment or connection interface.

Preferably, for instance, the loudspeaker basket is in the form of a pot, wherein the flange thereof forms a flange wall which extends axially and which is advantageously at least partially closed at the circumference. There is provided between this flange wall and the basket base or therein a hole/web structure with through-openings which extend in a circumferential direction and which are advantageously curved or slot-like and between which the basket or wall struts are formed.

The assembly configuration or assembly apparatus further has a sealing element. This sealing element serves to seal the loudspeaker or the loudspeaker basket thereof with respect to the carrier element. The sealing element is provided in the region of an abutment or connection interface between the loudspeaker basket, in particular the flange thereof, and the opening edge of the receiving opening. Advantageously, the sealing element is connected to the loudspeaker basket and, at that location, to the flange thereof in a materially engaging manner. The sealing element suitably surrounds the abutment interface in a complete or completely circumferential manner.

During the assembly of the loudspeaker on the carrier element, the basket base of the loudspeaker basket engages through the receiving opening in the carrier in such a manner that the flange on the basket abuts at the rear of the flange against the opening edge of the receiving opening with the sealing element being interposed. In other words, the assembly configuration is configured in such a manner that, during the assembly of the loudspeaker on the carrier element, the flange on the basket is placed against the opening edge of the recess in the carrier with the flange side thereof, which faces the basket base of the loudspeaker basket (flange rear side), with the sealing element being interposed. The term "flange on the basket" is intended to be understood here and below to mean that the flange is a component of the loudspeaker basket.

In the case of a carrier element which in a vehicle door separates a dry space, which faces the vehicle interior, from a wet space (toward the external door skin), the basket base and the wall or basket struts of the loudspeaker basket are located in the wet space while the flange of the loudspeaker is located in the dry space and the membrane of the loudspeaker faces the vehicle interior at the front.

In an advantageous embodiment, the loudspeaker basket has a number of joining elements. They correspond to joining contours on the carrier, in particular flaps (radial flaps) which project into the receiving opening or which are directed radially inwardly or orientated in a radial direction, webs or ribs, in order to produce a bayonet closure as a combined insertion/rotation connection. The assembly configuration consequently allows a particularly simple and reliable connection of the loudspeaker or the basket thereof to the carrier element without additional fixing means, such as, for example, screws, rivets, snap-fitting or clip-fitting elements or a fixing ring. The term "joining contour on the carrier" is intended to be understood here and below to mean that the joining contour is a component of the carrier element.

The term "bayonet closure" is intended to be understood here and below to mean a joining connection of the loudspeaker or the loudspeaker basket or loudspeaker housing thereof with respect to the carrier element by a combined insertion and rotational movement, wherein initially during the insertion operation a movement is carried out along a (rotation) axis which is normal to the interface plane and subsequently the rotational movement is carried out about this axis, for example, in the manner of a screw-in closure. The interface plane is the plane of the abutment interface between the receiving opening in the carrier and the flange on the basket.

According to an advantageous further development of the joining connection between the loudspeaker or the loudspeaker basket thereof and the carrier element at the abutment interface of the bayonet closure, the joining element on the basket has claw-like hook or closure structures as an integral fixing means of the loudspeaker basket which, during the production of the bayonet closure, engage over the corresponding joining contours on the carrier as an integral fixing means of the carrier element in the region of the abutment interface. In other words, the respective joining contour on the carrier, which is preferably formed on the opening edge of the recess in the carrier as a radial flap, during the rotational movement of the loudspeaker basket with respect to the carrier element, engages behind or under the associated joining element on the basket. This element is advantageously a closure hook which is formed on the loudspeaker basket and at that location preferably on the corresponding basket or wall struts. The term "joining element on the basket" is intended to be understood here and below to mean that the joining element is a component of the loudspeaker basket.

In an advantageous embodiment, a snap-fit connection is formed between at least one of the joining elements on the basket and the corresponding joining contour on the carrier when the bayonet closure is or becomes produced between the loudspeaker basket and the carrier element. In a suitable manner, at least one of the joining elements on the basket has an engaging contour and the joining contour on the carrier has a corresponding engaging element which engages in the engaging contour on the basket, particularly preferably via a run-in ramp which opens in the engaging contour on the basket, during the production of the bayonet closure between the loudspeaker basket and the carrier element.

According to a particularly advantageous further development, circular-arc-like cutouts and/or at least one axial flap on the flange on the basket are provided between the joining contours on the carrier. The cutouts on the carrier are provided for receiving the joining elements on the basket during an insertion movement during the production of the bayonet closure between the loudspeaker basket and the carrier element. In this case, the cutouts in the carrier provide different circular arc lengths, for example, also as a result of additional radial struts in the cutouts, so that only one possible insertion position of the loudspeaker basket in the recess in the carrier is provided for producing the bayonet closure during the insertion movement. Additionally or alternatively, the axial flaps on the basket can prevent an incorrect or undesirable insertion position of the loudspeaker or the basket thereof. Assembly errors, particularly according to the poka-yoke principle for directly covering errors, are thereby reliably avoided.

In an advantageous embodiment, the sealing element is in the form of a two-component seal or two-component sealing ring with a soft sealing component and with a comparatively hard or rigid sealing component. In a suitable manner, the sealing element has two concentric sealing lips, wherein one of the sealing lips, in particular a radially external sealing lip, axially projects over the other sealing lip. The radially internal lip of these sealing lips which is advantageously in the form of a comparatively hard or rigid sealing component advantageously acts as a radial sealing element (radial seal) and in particular as a centering element during the (insertion) assembly of the loudspeaker or the basket thereof into the receiving opening of the carrier element in the region of the connection or abutment interface. The radially internal sealing lip consequently preferably performs a double function. The radially external, axially projecting sealing lip which is advantageously in the form of a comparatively soft sealing component acts particularly as an axial sealing element (axial seal) for reliably sealing the loudspeaker with respect to the carrier element.

Another aspect of the assembly configuration or assembly apparatus provides for a ramp (start ramp), which extends in a circumferential direction of the flange on the basket and which is in particular circular-arc-like, to be provided on the flange of the loudspeaker basket on the flange side (flange rear side) which faces the opening edge of the receiving opening. This ramp extends in a suitable manner only over a limited circular arc or circular arc portion, in particular with a center angle of the radii of the circular arc between 10° and 30°, preferably between 15° and 20°.

In a suitable manner, a plurality of, preferably three ramps are provided on the flange on the basket. The respective ramp serves to produce a pressing force on the sealing element, particularly during the rotational movement during the production of the bayonet closure between the loudspeaker or the loudspeaker basket thereof and the carrier element. In a suitable manner, the respective ramp is arranged upstream of an associated joining element on the basket in such a manner that, during the production of the bayonet closure during the insertion assembly of the loudspeaker or the basket thereof, the joining contour or radial flap on the carrier is located in the same radius region as the ramp on the basket.

In a particularly advantageous manner, the respective ramp is provided in the region of the abutment interface between the receiving opening in the carrier and the sealing element. In other words, the respective ramp is advantageously located radially inwardly with respect to the sealing element, therefore is surrounded thereby and arranged on the flange on the basket at the flange rear side thereof which faces the mechanical abutment interface. It thereby becomes possible for the function of the ramp to be reliably performed and at the same time the sealing function of the sealing element also to be reliably performed.

The respective ramp allows, particularly in conjunction with the bayonet closure during the rotational movement of the loudspeaker basket with respect to the carrier element, in the region of the mechanical abutment interface, initially—virtually as a starting assistance—a reduced sealing pressure at the beginning of assembly and, during the further rotational movement during the joining operation, the production of the desired or correct pressing pressure on the sealing element. With increasing rotational movement, the joining contour on the carrier in the form preferably of the radial or joining flap, runs along the axially rising (introduction or run-in) ramp relative to the rotational movement of the loudspeaker or the loudspeaker basket thereof in order to produce, during the joining connection up to the production of the bayonet closure, particularly including a locking or latching by means of the snap-fit connection, the desired or correct pressing pressure on the sealing element.

In other words, the respective ramp is arranged upstream of the joining element on the basket in a circumferential direction of the flange on the basket in such a manner that, during the rotational movement of the loudspeaker basket with respect to or relative to the carrier element in the region of the mechanical abutment interface, initially a reduced sealing pressure is or becomes produced and, during the further rotational movement of the loudspeaker basket during the joining operation, an increasing pressing pressure is or becomes produced on the sealing element. Preferably, with an increasing rotational movement of the loudspeaker basket, the opening edge of the receiving opening in the carrier, in particular in the region of the joining contour on the carrier, is or becomes guided along the respective ramp, wherein the joining contour on the carrier in the form preferably of the radial or joining flap engages during the joining connection for producing the bayonet closure behind or under the joining element on the basket so as to produce the desired or correct pressing pressure on the sealing element.

Another aspect of the assembly configuration or assembly apparatus provides for, at a specific location of the abutment interface, preferably at a lowest location of the abutment interface, between the loudspeaker basket and the opening edge of the receiving opening in the carrier, a water discharge to be provided, in particular without a tank. This aspect similarly to the aspect of the ramp(s) on the flange on the basket constitutes an independent invention. A combination of these aspects or the respective aspect with the bayonet closure is particularly suitable as a preferred joining connection between the loudspeaker or the loudspeaker basket thereof and the carrier element of the assembly configuration or assembly apparatus.

A particularly suitable further development provides for the flange on the basket to have a receiving member or joining opening with a connection plug or insertion contact inserted therein for receiving a counter-plug for the loudspeaker, in particular for supplying electrical power to the loudspeaker coil. The carrier element has a blocking contour with a recess, which is adapted to the connection plug or the counter-plug (on the cable), wherein the insertion contact on the basket or connection plug is aligned with the recess in the carrier only in a desired end position of the loudspeaker basket on the opening edge of the receiving opening in the carrier. This acts as a technical precaution for insertion contacting of the external connection plug or counter-plug (on the cable) by the plug being able to be contacted via plugs with the connection plug on the basket only when the loudspeaker has been assembled in the intended position and location on the carrier element. Assembly errors are thereby reliably able to be found or identified and avoided. This aspect also constitutes an independent invention. A combination of these aspects or the respective aspect with the bayonet closure is particularly suitable as a preferred joining connection between the loudspeaker or the loudspeaker basket thereof and the carrier element of the assembly configuration or assembly apparatus.

The assembly configuration is particularly suitable in conjunction with a door module of a motor vehicle. In this case, the carrier element which comprises, for example, plastics material or a fiber composite material, is a component or an integral component of a door module carrier plate or an internal door metal sheet. The door module carrier plate acts as a unit or component carrier for the loudspeaker and for additional components, in particular for a door lock and for a window lifting mechanism or components thereof. The door module carrier plate, to which the carrier element is fixed or the integral component of which it is, is particularly also used to separate a dry space between the door module carrier plate or the internal door metal sheet and an internal door trim from a wet space between the door module carrier plate or the internal door metal sheet and an external door skin (external door metal sheet).

The loudspeaker which is mounted in the receiving opening in the carrier and which is preferably a mid-range or woofer loudspeaker according to the dynamic coil principle projects with the basket base of the loudspeaker basket thereof into the wet space while the loudspeaker membrane is located in the dry space and faces the vehicle interior.

In order to avoid water collecting in the wet space on the loudspeaker, the assembly configuration has a suitable water discharge so as to avoid a tank formation, in which water could accumulate. To this end, a circle segment of the abutment interface is configured in a reduced manner in a radial direction at a lowest location in the installation state of the loudspeaker or at a location or position which is provided vertically as low down as possible, relative to a vehicle coordinate system in the z direction of the motor vehicle. In other words, the circle segment is recessed at the opening edge of the receiving opening in the carrier. This recess in the carrier is aligned with a recess or elongate basket opening in the basket which also extends at least slightly radially into the abutment interface over a circle segment and in a suitable manner.

In this region of the circle segment, the radial width of the abutment interface is preferably smaller than the radial width of the abutment interface which extends in a circumferential direction outside this region. In particular, the sealing flange on the carrier is asymmetric with respect to the sealing region on the basket or flange. In other words, the circular-ring-like faces of the sealing flange or region on the carrier and the sealing region on the basket or flange are displaced relative to each other. An oval form of the sealing element or the seal is thereby avoided between the loudspeaker basket and the receiving opening in the carrier or the opening edge thereof.

At the external circumference of the mechanical abutment interface of the assembly configuration, there is provided on the basket, that is to say, on the flange of the loudspeaker basket, an axial wall which is preferably closed completely at the circumference but which is at least partially closed or an abutment collar which extends in an axial direction for the sealing element. The sealing element adjoins it, preferably with the radially external sealing lip. The radially internal circumferential side or annular face of the sealing element, in particular the radially internal sealing lip thereof, is aligned in a suitable manner with the recess in the carrier and with the recess in the basket. In other words, a radially internal circle-segment-like circumference region of the sealing element which is arranged on the flange on the basket merges in the region of the recess in the basket (basket opening) into the recess in the carrier, preferably in a manner without transitions, steps or edges as far as possible and/or in a planar manner.

The advantages afforded with the invention particularly involve the abutment interface (loudspeaker interface) constituting a higher connection rigidity over the generally conventional connection rigidities between the loudspeaker basket and the opening edge of the receiving opening in the carrier in conjunction with the loudspeaker. Furthermore, the loudspeaker basket is or can be optimized with respect to acoustic ventilation in the direction toward symmetrical loading. Furthermore, as a result of the opening faces of the loudspeaker basket being as symmetrical as possible, a symmetrical flow resistance on the loudspeaker membrane is produced, whereby "wobbling" of the membrane is reduced. Furthermore, undesirable ventilation noises are avoided by an edge and face reduction in the main flow region of the loudspeaker membrane and flow losses are reduced. With respect to the interface on the carrier (basic carrier interface), a comparatively rigid loudspeaker connection is obtained, which again increases the sound quality and improves the pulse fidelity of the loudspeaker system.

Other features which are considered as characteristic for the invention are set forth in the appended claims.

Although the invention is illustrated and described herein as embodied in an installation assembly for a loudspeaker in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
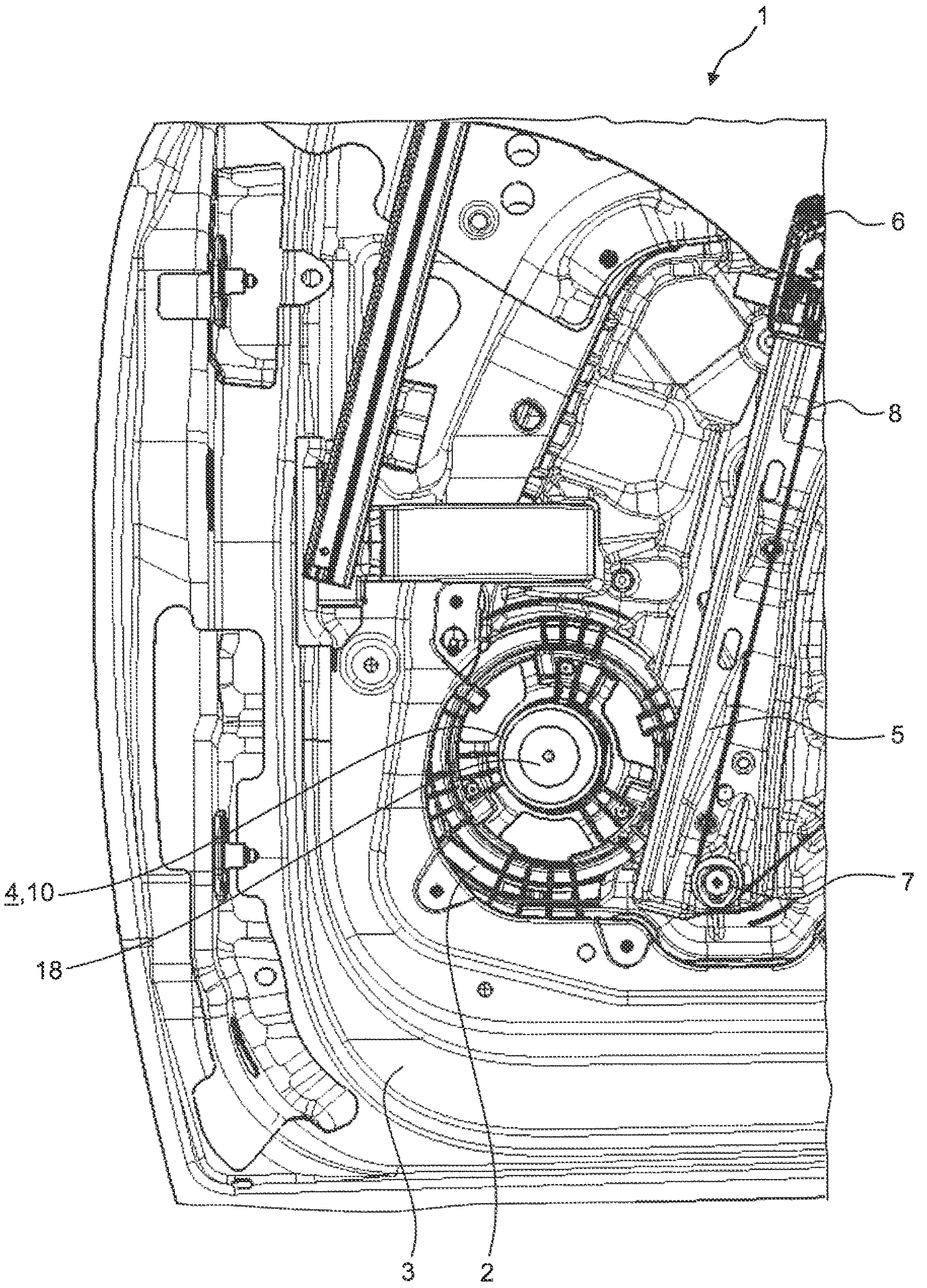
FIG. 1 is an illustration showing a cutout of an assembly configuration of a loudspeaker on a carrier element of a door module of a vehicle door of a motor vehicle in a view toward a wet space side.

Mutually corresponding parts and sizes are indicated with the same reference numerals in all the figures.

Indications with respect to the spatial directions, including particularly in a coordinate system of the motor vehicle (vehicle coordinate system) are set out below. In this case, the abscissa axis (X axis, X direction) is orientated in the longitudinal vehicle direction (travel direction) and the ordinate axis (Y axis, Y direction) is orientated in the transverse vehicle direction and the applicate axis (Z axis, Z direction) is orientated along the vehicle height.

Figure 2:
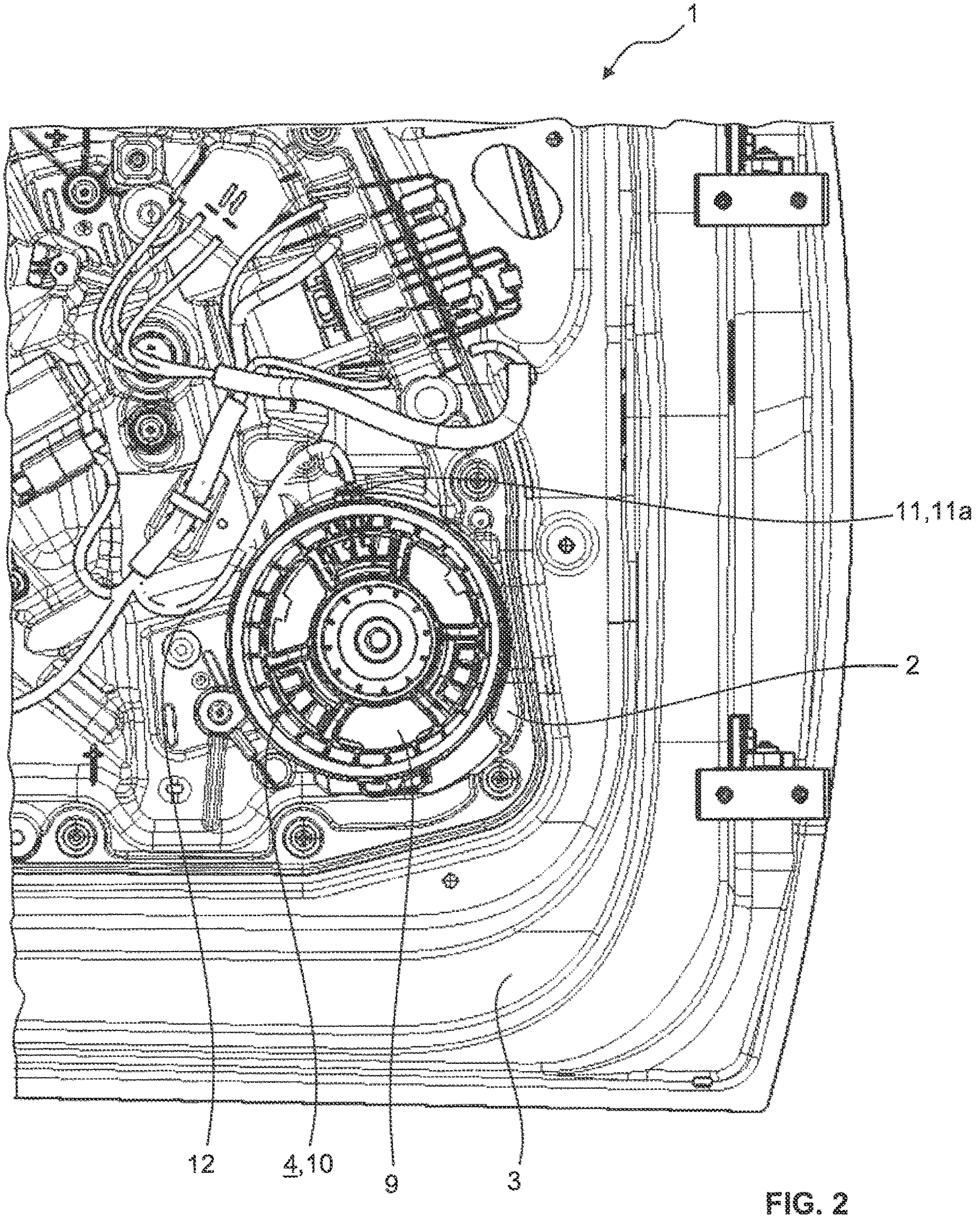
FIG. 2 is an illustration showing a cutout of the assembly configuration according to FIG. 1 in a view toward a dry space side of the door module.

Referring now to the figures of the drawings in detail and first, particularly to FIGS. 1 and 2 thereof, there is shown a cutout of a door module 1 of a vehicle door of a motor vehicle in a view toward a wet space side or toward a dry space side. The door module 1 contains a carrier element 2 which comprises, for example, plastics material or a fiber composite material. The carrier element 2 which may be a separate component is in the exemplary embodiment an integral component of a door module carrier plate or an internal door metal sheet 3 which is provided and configured as a unit carrier or component carrier for a loudspeaker 4 and for additional components, in particular for components of a window lifting mechanism. Partially visible components of a window lifting mechanism are a guide rail 5 with rail slides or carriers 6 which are guided thereon in a slidingly movable manner for a window pane (not illustrated). The rail slider 6 is connected to a pulling cable 8 which is guided via at least one cable roller 7 on the rail and which is coupled to an electromotive cable drive (not visible). The door module carrier plate 3 is also used to separate the dry space (FIG. 2) between the door module carrier plate 3, on the one hand, and an internal door trim (not shown) from the wet space (FIG. 1) between the door module carrier plate 3 and an external door skin (not shown), on the other hand.

As can be seen in FIG. 2, the loudspeaker 4 is located in a loudspeaker opening, which is referred to below as the receiving opening 9 in the carrier, of the carrier element 2. The loudspeaker 4, which is illustrated here without a (loudspeaker) membrane and in FIG. 3 with a (loudspeaker) membrane, has a loudspeaker basket 10 and a connection plug 11 which is connected to a counter-plug 11*a* on a connection cable 12 for operating or supplying electrical power to the loudspeaker 4 or which is connected via plugs during assembly.

Figure 3:
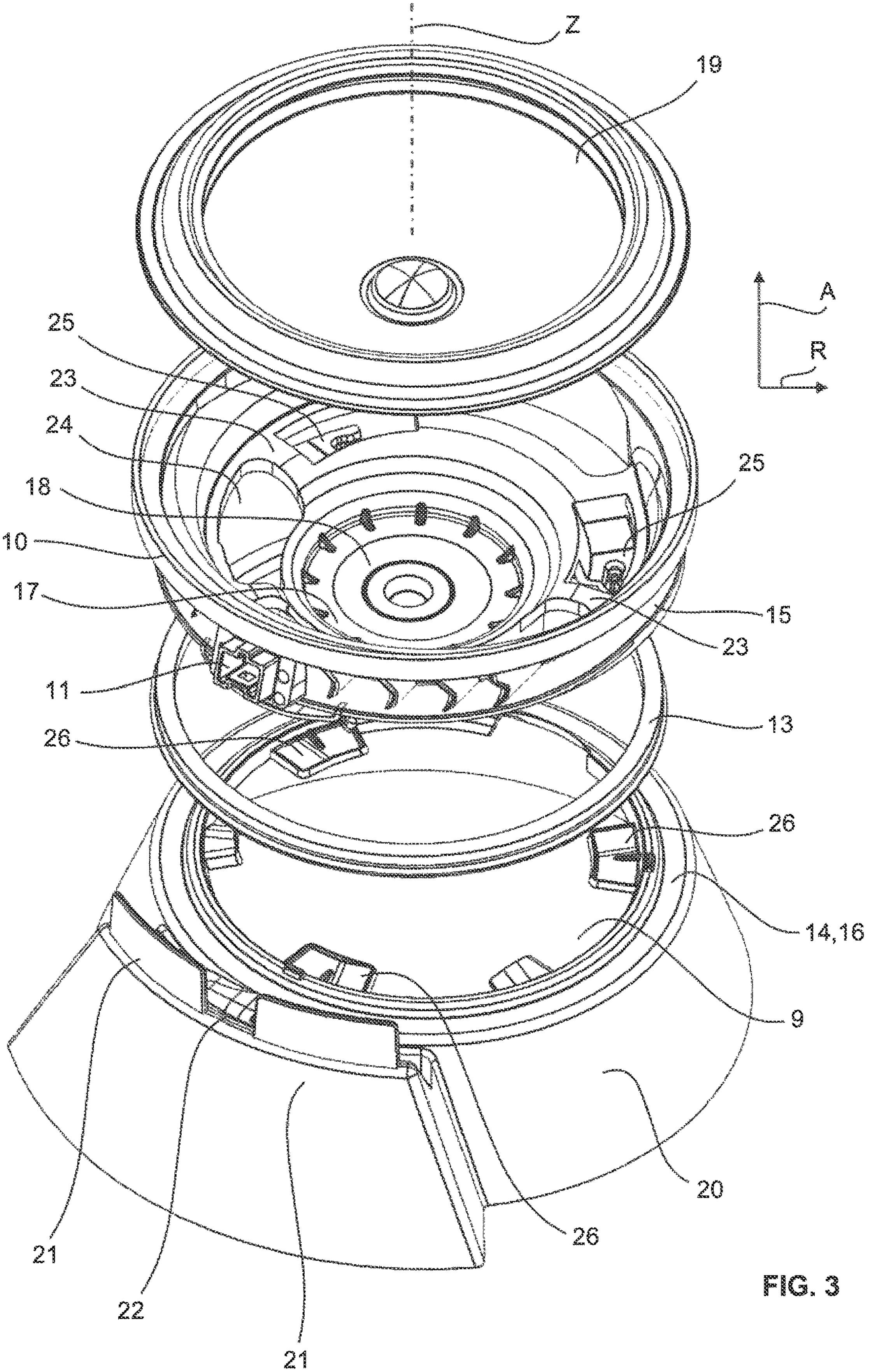
FIG. 3 is an exploded, perspective view of the assembly configuration of the loudspeaker on the carrier element.

FIG. 3 shows an exploded illustration of the assembly configuration of the loudspeaker 4 and the carrier element 2 and an annular sealing element (sealing ring) 13. Below, directional indications, such as an axial direction A and a radial direction R, refer to the plane of a mechanical connection or abutment interface 14 between a flange 15 of the loudspeaker basket 10 and the opening edge 16 of the receiving opening 9 in the carrier. The central axis Z, which is illustrated only partially here for the sake of greater clarity, of the assembly configuration extends normally (perpendicularly) to the plane of the connection interface 14 from the loudspeaker 4 and the carrier element 2. With respect to the vehicle coordinate system, the central axis Z extends in the Y direction of the motor vehicle, that is to say, in the transverse vehicle direction.

At the flange rear side 15*b* which faces the opening edge 16 in the dry space of the receiving opening 9 in the carrier (FIG. 5) of the basket flange 15, which is also referred to below as the flange on the basket, of the loudspeaker basket 10, the sealing element 13 is fixed thereto, preferably in a materially engaging manner. The flange 15 has a flange wall 15*a* which extends in an axial direction A and which is preferably at least partially closed in a circumferential direction of the flange 15 or the loudspeaker basket 10. The annular wall edge thereof, which is directed toward a basket base 17 of the loudspeaker basket 10, or annular face forms the flange rear side 15*b*, which faces the opening edge 16 of the receiving opening 9 on the carrier, of the basket flange 15.

The loudspeaker 4 which is intended to be mounted in the receiving opening 9 on the carrier or which is mounted therein is a mid-range or woofer loudspeaker according to the dynamic coil principle, the basket base 17 of which projects into the wet space with a permanent magnet 18 mounted thereon while a loudspeaker membrane 19 is located in the dry space and faces the vehicle interior (in the Y direction). The diameter of the flange 15 on the basket is, for example, approximately from 12 cm to 15 cm and the frequency response of the loudspeaker 4 is particularly in the range between approximately 40 Hz or 200 Hz and 2 kHz.

The carrier element 2 is configured in the region of the receiving opening in the carrier and/or the acoustic baffle opening 9 in a cup-like manner with a wall 20 which expands conically into the wet space. There is provided on the wall 20 a formed member 21 with a plug receiving member or plug leadthrough 22, which extends in an axial direction A and in a circumferential or tangential direction, for the counter-plug 11*a* on the cable. The correct assembly of the loudspeaker 4 requires that the connection plug 11, which is inserted in a receiving member (not described in greater detail) of the flange 15 or the flange wall 15*a* thereof—in a radial direction R—is aligned with the plug receiving member 22 on the carrier.

According to the poka-yoke principle, consequently, an insertion contacting of the counter-plug 11*a* on the cable with the connection plug 11 on the basket or loudspeaker is enabled only when the loudspeaker 4 is located in the receiving opening 9 in the carrier in a correct desired position or desired location (desired end position). The plug receiving member or leadthrough 22 on the carrier in the form of a recess which is adapted to the connection plug 11 or the counter-plug 11*a* consequently forms virtually a blocking contour in such a manner that the connection plug or plug contact 11 on the basket is aligned with the recess 22 in the carrier only in the desired position or desired end position of the loudspeaker basket 10 in the receiving opening 9 in the carrier.

The loudspeaker basket 10 which opens in the assembly configuration in the dry space has a number of basket or wall struts or webs 23 which extend from the basket base 17 toward the flange 15. With respect to the preferably circular-ring-like flange 15 and the circular receiving opening 9 in the carrier and the axis Z which is normal thereto, the basket struts (wall or basket webs) 23 extend approximately in a star-like manner and are therefore orientated in a radial direction R. The basket struts or webs 23 can also extend from the basket base 17 in the direction of the flange 15 on the basket at an inclination angle. The basket base 17 and the flange 15 can be axially offset relative to each other.

The basket struts 23 are formed between slot-like basket or through-openings 24 which extend in an arcuate manner in a circumferential direction of the loudspeaker basket 10. This hole/strut structure containing the basket openings 24 and the basket struts 23 can be arranged in the basket base 17 or between the basket base and the basket flange 15.

A joining element 25 is formed on at least some of the basket struts 23. These joining elements 25 on the basket correspond to joining contours 26 on the carrier for producing a bayonet closure. The joining elements 25 on the basket have a claw-like hook structure or are active in the form of claws or closure hooks or claws. The joining contours 26 on the carrier are in the form of radial flaps which are formed on the carrier element 2 in the region of the opening edge 16 of the receiving opening 9 in the carrier and which extend in a radial direction R into the receiving opening 9.

During the assembly of the loudspeaker 4 on the carrier element 2, the loudspeaker basket 10 engages through the receiving opening 9 in the carrier so that the flange 15 on the basket abuts at the rear against the opening edge 16 of the receiving opening 9 with the sealing element 13 being interposed. The sealing element 13 which serves to seal the loudspeaker 4 or the basket 10 thereof with respect to the carrier element 2 covers the abutment interface 14, preferably in a completely circumferential manner.

As further explained below with reference to FIGS. 9 to 12, and as depicted comparatively clearly particularly with reference to FIG. 9, the bayonet closure is produced as a joining connection of the loudspeaker 4 or the basket thereof (loudspeaker basket) with respect to the carrier element 2 in that initially an insertion operation is carried out in an axial direction A along the (rotation) axis Z which is normal to the interface plane and subsequently a rotational movement is carried out about this axis Z, in the exemplary embodiment in a counter-clockwise direction. The interface plane is the plane of the connection interface 14 between the receiving opening 9 in the carrier and the flange 15 on the basket.

During the production of the bayonet closure and in this instance during the rotational movement of the loudspeaker 4 or the loudspeaker basket thereof with respect to the carrier element 2, the joining element 25 on the basket engages over the joining contours 26 on the carrier in the region of the mechanical abutment or connection interface 14 of the assembly configuration. In this instance, the respective joining contour 26 on the carrier engages behind or under the associated joining element 25 on the basket during the rotational movement of the loudspeaker basket 4 with respect to the carrier element 2.

Figure 4:
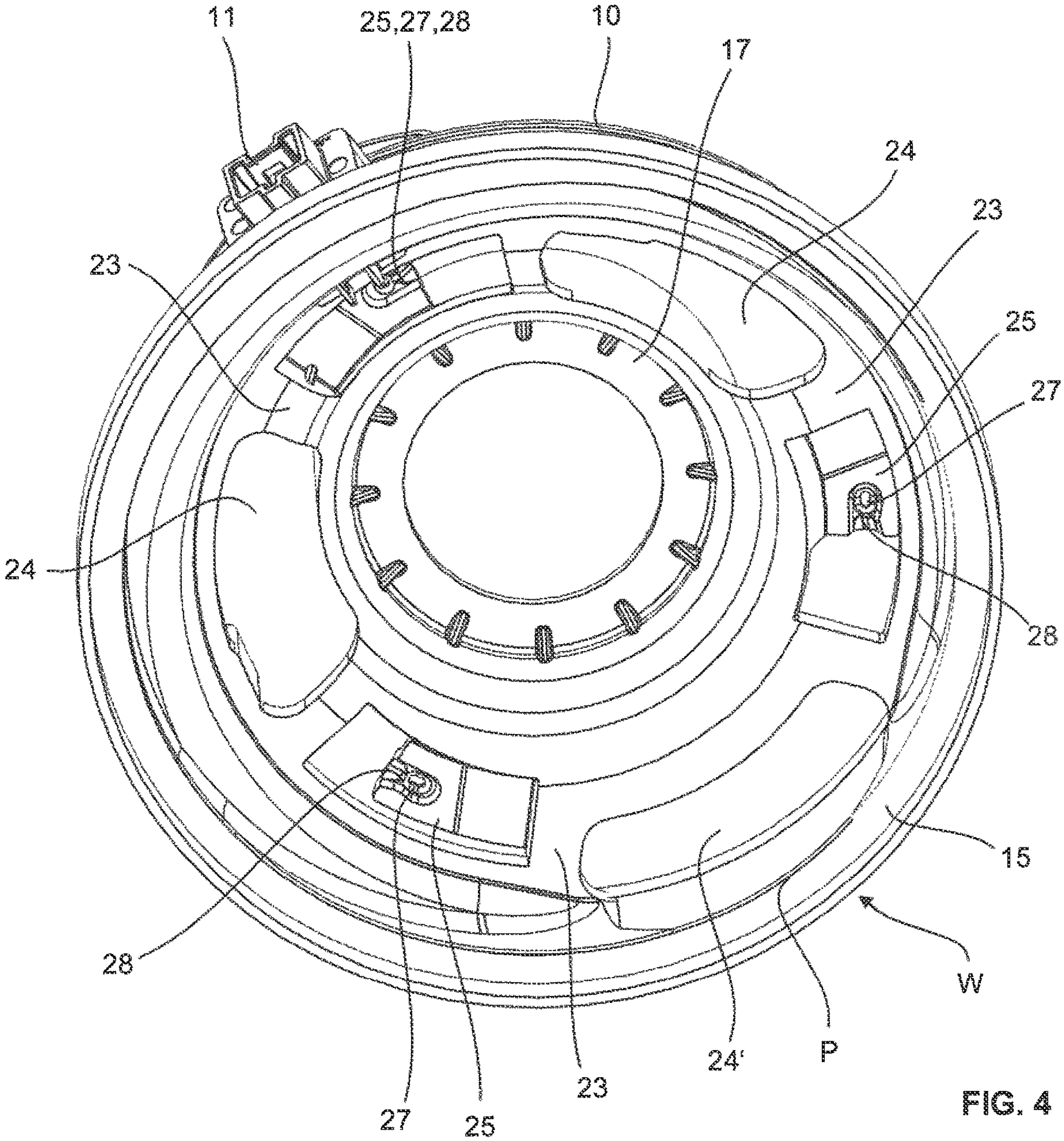
FIG. 4 is a perspective view of a loudspeaker basket of the loudspeaker in a view into the loudspeaker basket.
Figure 5:
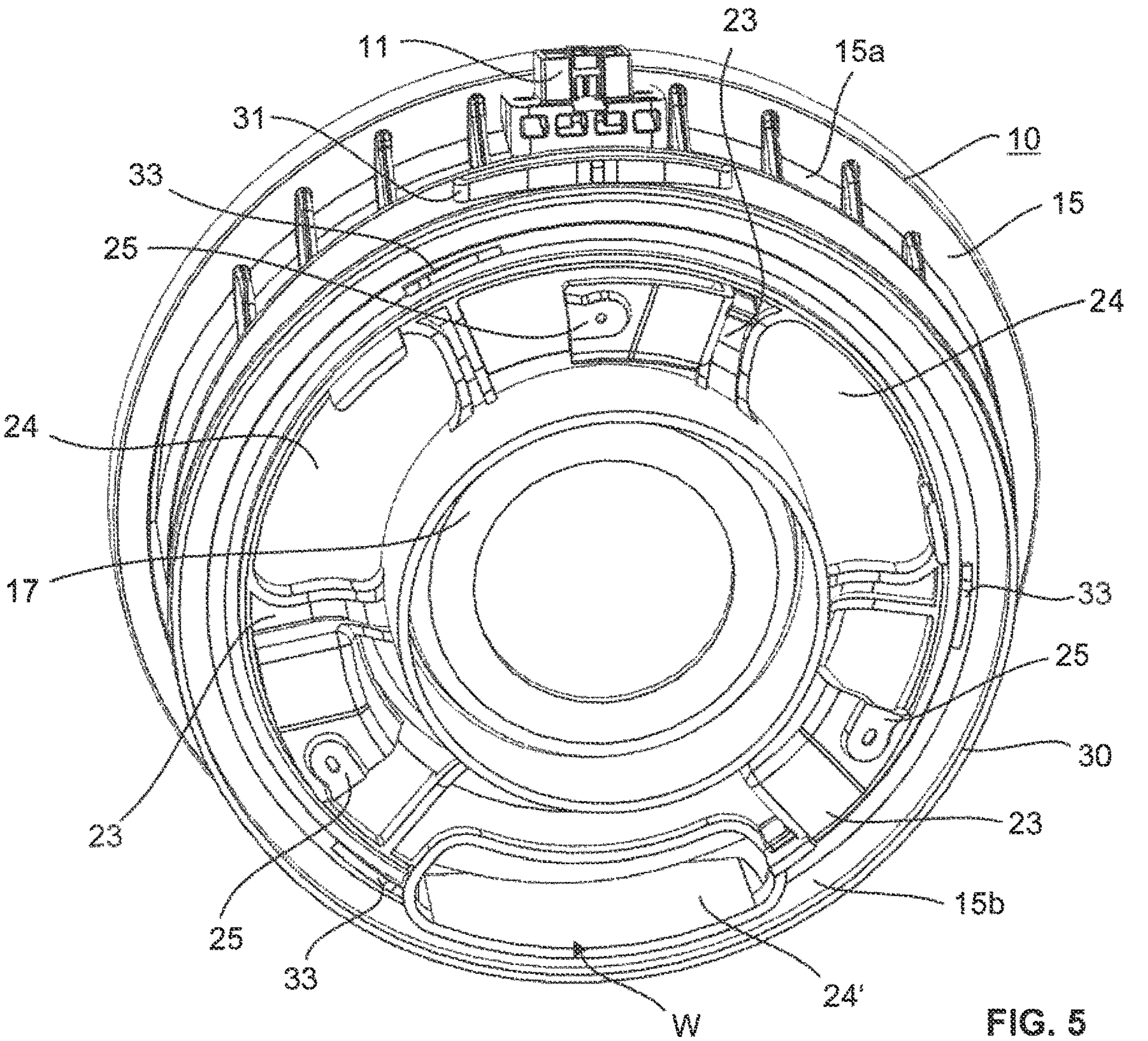
FIG. 5 is another perspective view of the loudspeaker basket in a view toward the flange rear side of a flange of the loudspeaker basket without any sealing element.
Figure 6:
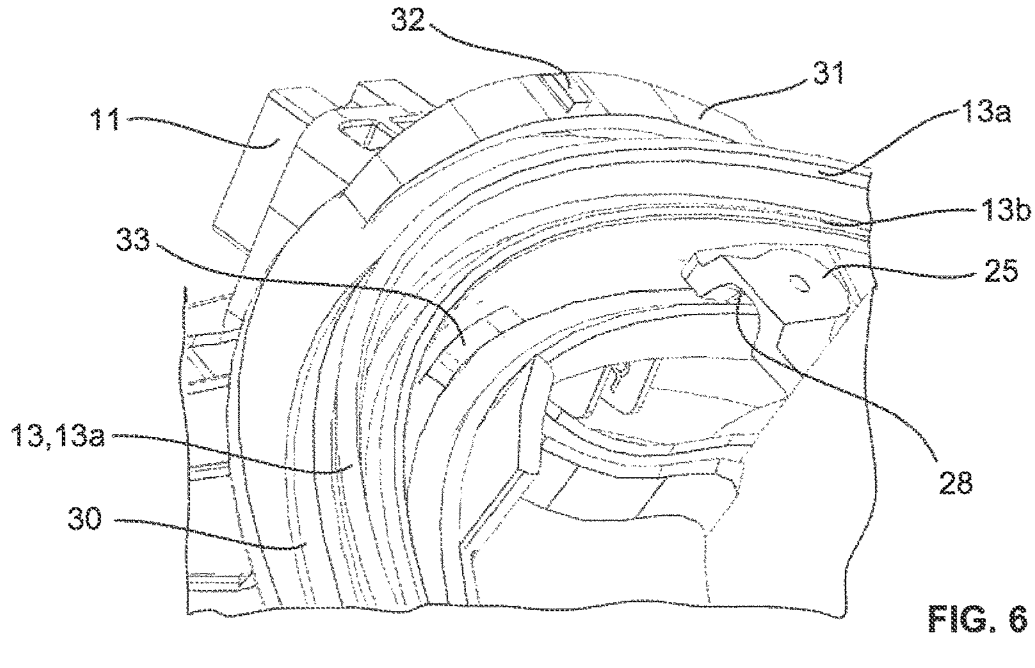
FIG. 6 is an enlarged, perspective, cutout view from FIG. 5 in the region of a joining element of the loudspeaker basket with a sealing element which is fixed to the flange thereof at the rear side and in a view into a run-in ramp of the joining element on the basket as a different perspective view from the one in FIG. 5.

FIGS. 4 to 6 show the loudspeaker basket 10 in a view therein or in a view toward the flange rear side 15*b*, which faces the abutment interface 14, of the flange 15 with the sealing element 13 which is intended to be arranged there (FIG. 5) or which is preferably fixed in a materially engaging manner.

As can be seen in FIG. 4 and in particular in FIG. 6 in a comparatively clear manner, the joining elements 25 on the basket have a bead-like engaging cavity or engaging contour 27, in which a groove-like run-in ramp 28 opens. These engaging contours 27 which cooperate with (stud-like) engaging elements 29 (FIG. 8) on the joining contours (radial flaps) 26 on the carrier serve to produce a snap-fit connection at the end of the rotational movement of the loudspeaker 4 or the loudspeaker basket 10 thereof with respect to the carrier element 2 in order to lock the bayonet closure, preferably in a releasable manner.

The sealing element 13 has two concentric sealing lips 13*a*, 13*b*, wherein the radially external sealing lip 13*a* projects above the radially internal sealing lip 13*b* axially. The sealing element 13 is in the form of a two-component seal, wherein the radially internal sealing lip 13*b* is in the form of a comparatively hard or rigid sealing component while the radially external sealing lip 13*a* is a comparatively soft sealing component. At the flange rear side 15*b* of the flange on the basket, there is provided an axial web 30 in the form of a circumferential abutment collar, against which the radially external sealing lip 13*a* abuts at the external circumference or against which the sealing element 13 is supported in a radial direction R.

Figure 8:
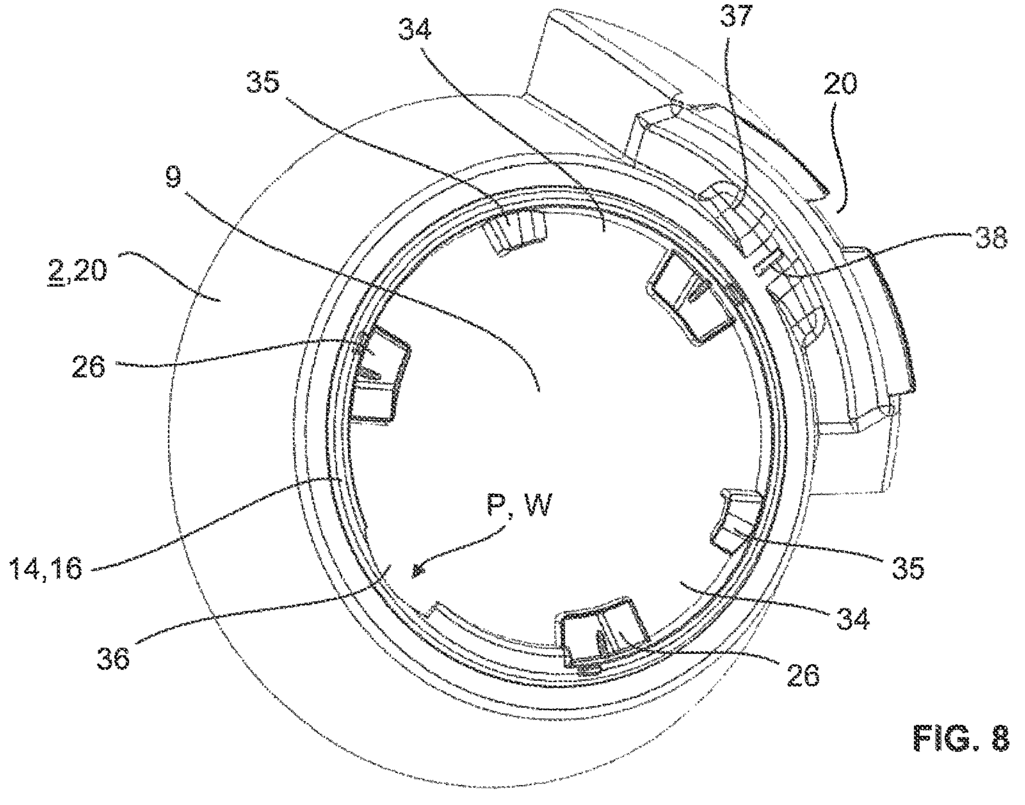
FIG. 8 is a front, perspective view of the carrier element.

In the region of the connection plug 11, there is provided on the flange 15 at the flange rear side a resilient element 31 having a central engaging dome 32 for an additional engagement of the loudspeaker 4 with the carrier element 2 (FIG. 8).

On the flange 15 of the loudspeaker basket 10 on the flange rear side 15*b*, which faces the opening edge 16 of the receiving opening 9, there are provided ramps (start ramps) 33 which extend in a circumferential direction of the flange 15 on the basket and which are in particular circular-arc-shaped. The ramps 33 extend only over a limited circular arc or circular arc portion, preferably with a center angle of the radii of the circular arc between 10° and 30°, in a suitable manner between 15° and 20°.

The ramps 33 serve to produce a pressing force on the sealing element 13 during the rotational movement during the production of the bayonet closure between the loudspeaker 4 or the loudspeaker basket 10 thereof and the carrier element 2. The respective ramp 33 is provided in the region of the abutment interface 14 between the receiving opening 9 on the carrier and the sealing element 13 and is consequently located radially inwardly with respect to the sealing element 13. The function of the ramp 33 is thereby ensured and also the sealing function of the sealing element is reliably performed. Furthermore, the assembly of the loudspeaker 4 on the carrier element 2 is further simplified by means of the ramps 33.

During the rotational movement of the loudspeaker basket 10 with respect to the carrier element 2, in particular during the production of the bayonet closure, the ramps 33 in the region of the mechanical abutment or connection interface 14 bring about a starting assistance by initially a reduced sealing pressure being produced at the start of assembly and during the further rotational movement during the joining operation the correct pressing pressure being produced on the sealing element 13.

With an increasing rotational movement of the loudspeaker 4 or the basket 10 thereof, the joining contours 26 on the carrier travel along the introduction or run-in ramps 33 reliably under or behind the joining elements 25 on the basket until producing the bayonet closure including the latching or locking by means of the snap-fit connection between the engaging elements or engaging studs 29 on the carrier and the engaging cavities 27 on the basket. To this end, the respective ramp 33 is arranged upstream of the joining element 25 on the basket in such a manner that, during the rotational movement of the loudspeaker basket 10 in the region of the mechanical abutment or connection interface, initially a reduced sealing pressure is produced and, during the further rotational movement of the loudspeaker 4 or the loudspeaker basket 10, an increasing pressing pressure is produced on the sealing element 13.

In order to avoid water which accumulates in the wet space on the loudspeaker 4, a suitable water discharge W is provided so as to avoid the formation of a tank, in which water could collect. The water discharge W is provided in a suitable manner at a lowest location P, this means at a lower position, in the Z-direction of the vehicle, of the abutment interface 14 of the assembly configuration between the loudspeaker basket 10 and the opening edge 16 of the receiving opening 9 on the carrier. To this end, one of the basket openings 24 is in the form of a recess which is designated 24' and which extends over a circle segment and in a radial direction slightly into the abutment interface 14 on the basket.

In the region of these basket openings or this recess 24' in the basket, the radial width of the flange rear side 15*b* is smaller than the radial width of the flange rear side 15*b* which extends in a circumferential direction outside this region. The flange 15 on the basket merges at this location in the region of the lowest location P directly into the recess 24' in the basket, this means without edges and steps (FIG. 4).

Figure 7:
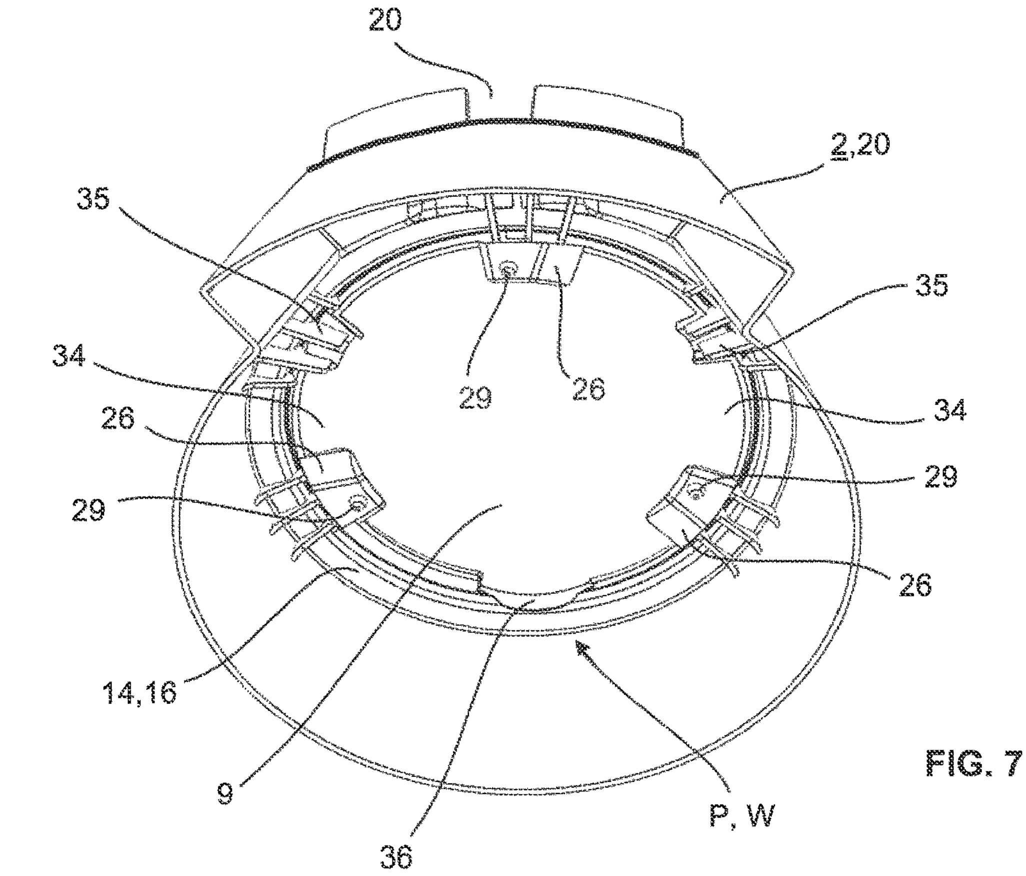
FIG. 7 is a perspective rear view of the carrier element with joining contours in the form of radial flaps with formed-on engaging studs.

FIGS. 7 and 8 show the carrier element 2 in different perspective illustrations, wherein FIG. 7 shows the carrier element 2 from the rear side (wet space side) which faces away from the loudspeaker 4 and FIG. 8 shows the carrier element 2 from the abutment or assembly side (dry space side) which faces the loudspeaker 4. In FIG. 7, the engaging studs 29 on the carrier can be seen on the joining contours 26, which are in the form of radial flaps, of the carrier element 2.

Figure 9:
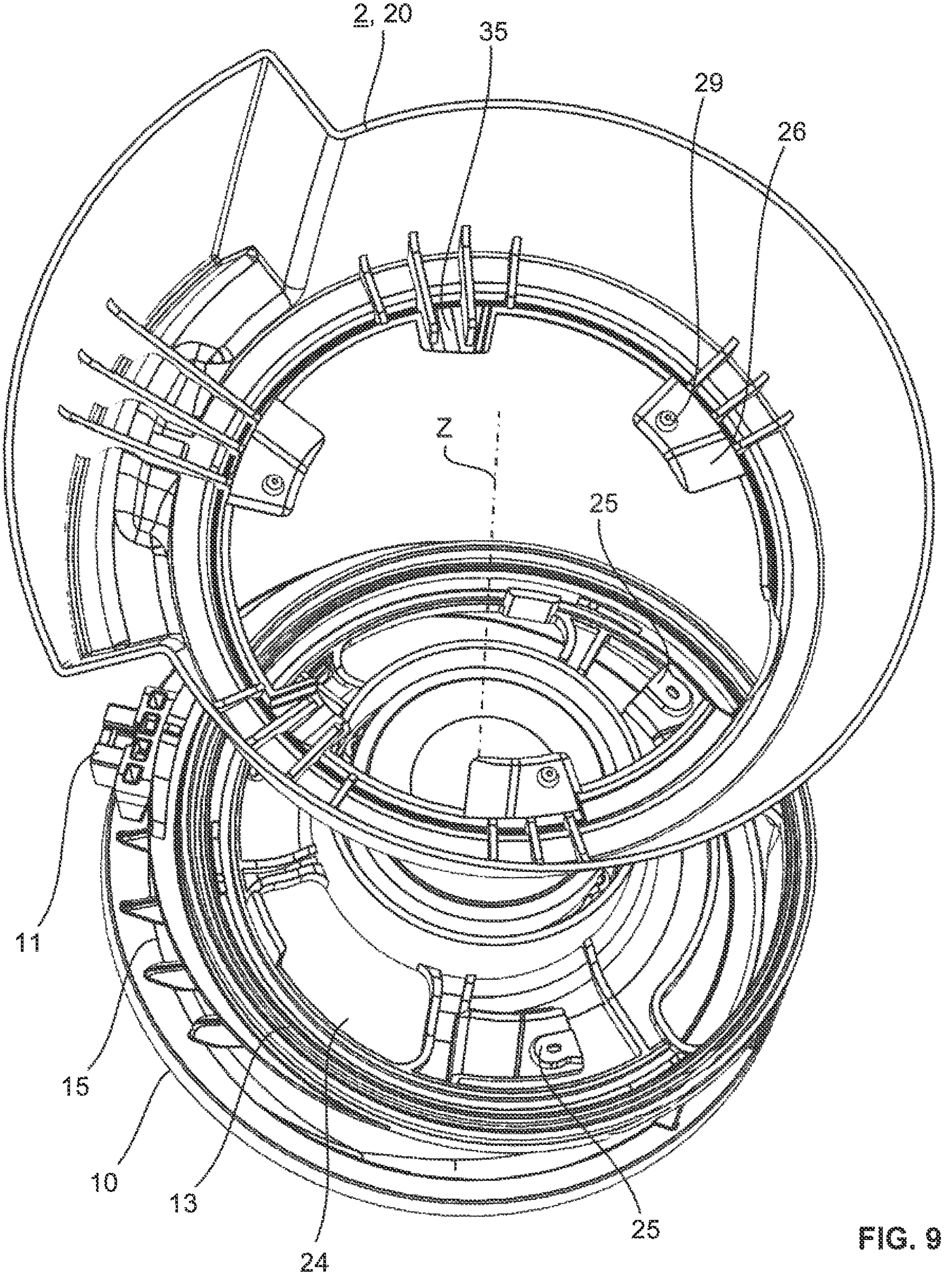
FIG. 9 is an exploded, perspective view of an assembled state at the start of an insertion movement of the loudspeaker along a (central) insertion and rotation axis into a receiving opening in the carrier.

FIG. 9 shows an exploded view of an assembly state during or at the beginning of the insertion movement of the loudspeaker 4 or the basket 10 thereof in an axial direction A and along the (central) insertion and rotation axis Z into the receiving opening 9 in the carrier.

Figure 10:
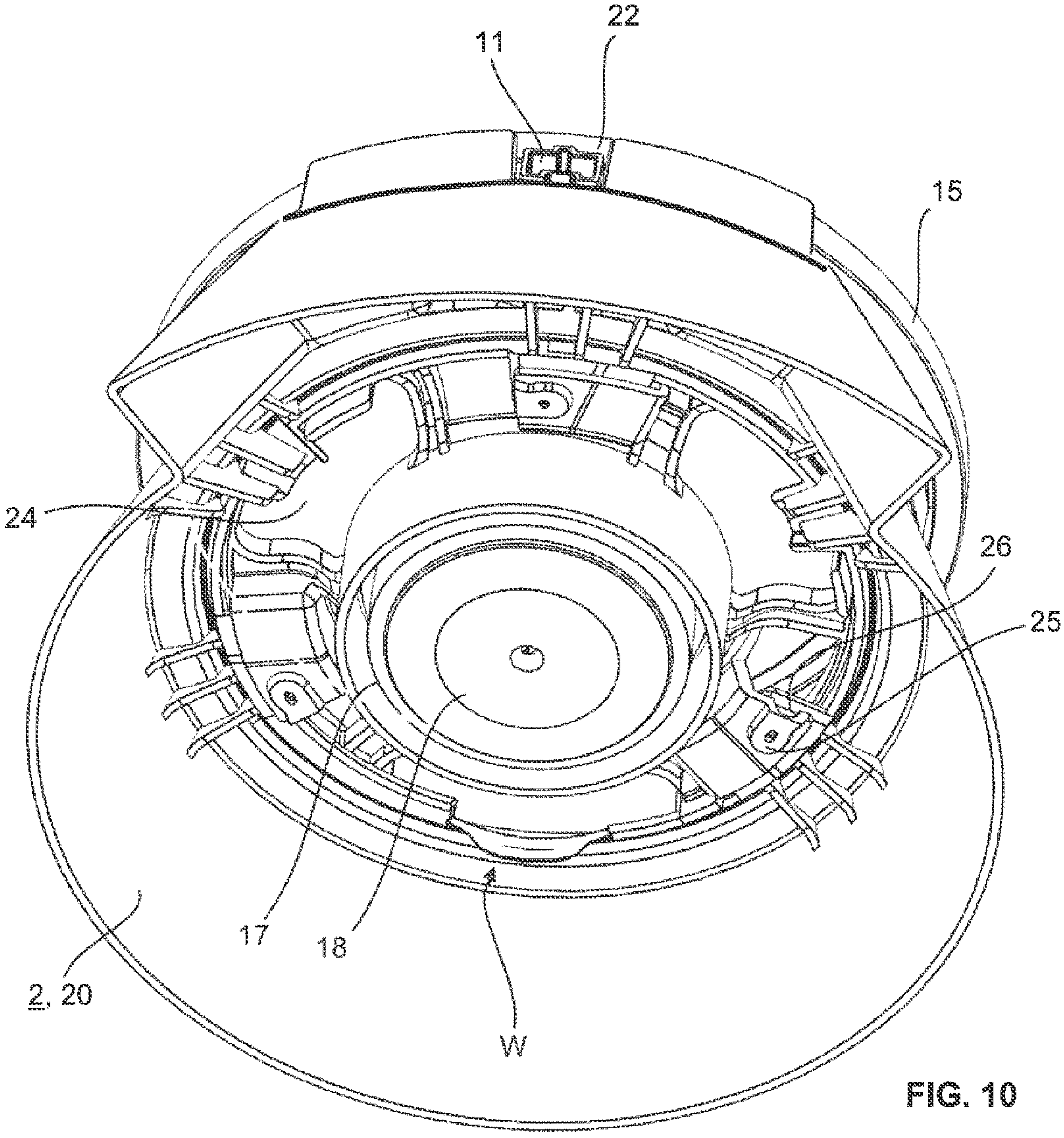
FIG. 10 is a perspective view toward the lower side (wet space side) of the assembly configuration of the loudspeaker on the carrier element with a bayonet closure being produced.
Figure 11:
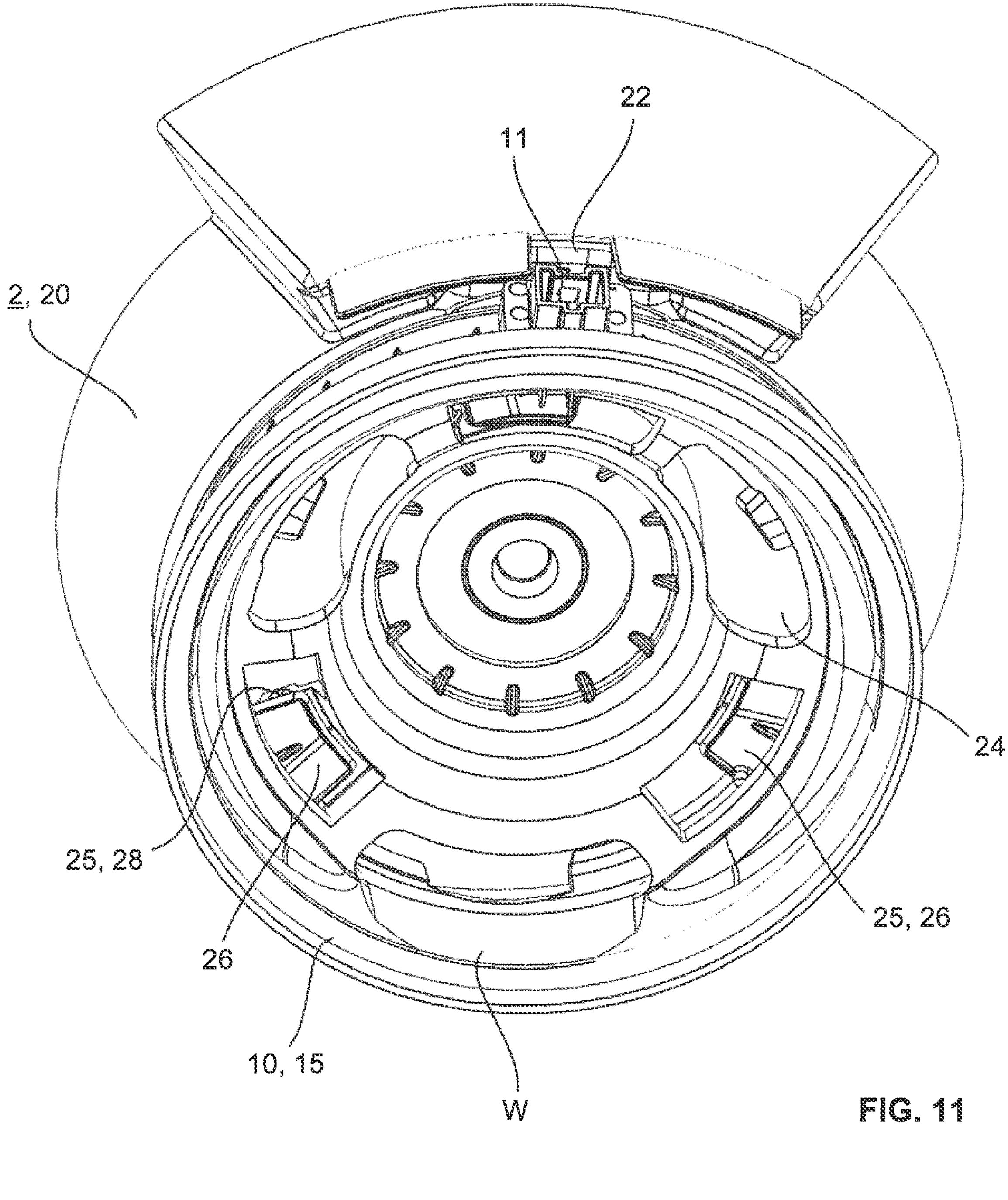
FIG. 11 is a perspective view of the front side (dry space side) of the assembly configuration according to FIG. 10.

FIGS. 10 and 11 show perspective views of the rear side (wet space side) or the front side (dry space side) of the assembly configuration of the loudspeaker 4 or the basket 10 thereof on or at the carrier element 2 with the bayonet closure being produced, including the snap-fit connection between the engaging elements 27 and 29 on the basket and carrier, respectively.

FIGS. 7 and 8 show circular-arc-like cutouts 34 between the joining contours 26 on the carrier. The joining elements 25 on the basket engage in these cutouts 34 in the carrier during the insertion movement during the production of the bayonet closure. In this case, the cutouts 34 in the carrier provide different circular arc lengths by additional radial struts or flaps 35, which project inside specific cutouts 34 into the receiving opening 9 in the carrier and which are formed on the circumferential wall 16, forming circle segments of the cutouts 34 with different sizes. Only one single correct or possible insertion position of the respective joining element 25, on the basket, of the loudspeaker basket 10 in these cutouts or recesses 34 in the carrier is thereby provided for producing the bayonet closure during the insertion movement.

FIG. 8 shows in the region of the formed member 21 of the carrier element 2 a bead-like engaging cavity 37 with a (central) engaging groove 38. During the production of the bayonet closure, the engaging cavity 37 in the carrier receives the resilient element 31 on the basket, wherein the engaging dome 32 of the resilient element 31 on the basket engages in the engaging groove 38 of the engaging cavity 37 in the carrier for an additional snap-fit connection of the loudspeaker 4 or the basket 10 thereof.

At the lowest location P, that means at a location or position of the carrier element 2 provided as low down as possible, a circle-segment-like recess 36 is provided for the water discharge W at the opening edge 16 of the receiving opening 9 in the carrier. The recess 36 in the carrier is aligned with the recess 24' which is in the basket and which also extends over a circle segment and in a suitable manner at least slightly radially into the abutment interface 14. In this region of the recess 36 in the carrier, the radial width of the abutment interface 14 is smaller than the radial width of the annular abutment interface 14 which extends in a circumferential direction outside this region. In other words, in this region of the recess 36 in the carrier, the radial width of the circumferential edge 16 of the receiving opening 9 in the carrier is smaller than the radial width of the (annular) portion, which extends outside this region, of the circumferential edge 16 of the receiving opening 9 on the carrier.

As can be seen in FIGS. 10 and 11, the radially internal circumferential side or face of the sealing element 13 or the radially internal sealing lip 13*b* thereof is aligned, when the assembly configuration is produced, with the recess 36 in the carrier and with the recess 24' in the basket in the region of the lowest location P for providing the water discharge W. In this case, a radially internal, circle-segment-like circumferential region of the sealing element 13, which is arranged on the flange 14 on the basket, merges in the region of the recess 24' in the basket into the recess 36 in the carrier without transitions, steps or edges as far as possible and/or in a planar manner.

Figure 12:
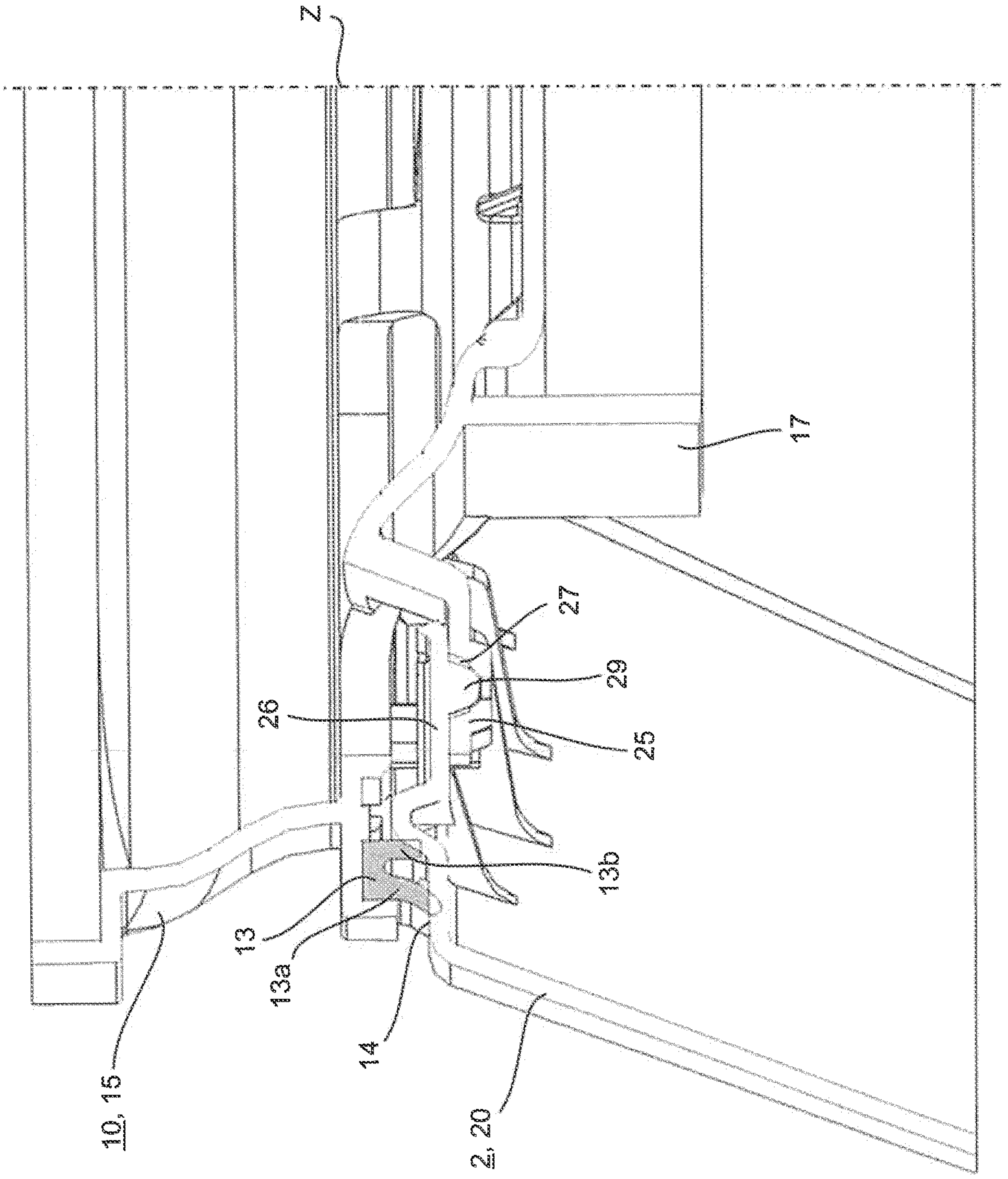
FIG. 12 is a perspective view of a section of the assembly configuration.

FIG. 12 shows a sectional illustration of the joining region with the snap-fit connection between one of the joining elements 25 on the basket and the corresponding joining contour 26 on the carrier and the abutment of the sealing element 13 against the mechanical abutment interface 14 between the mounted loudspeaker 4 or the basket 10 thereof and the carrier element 2 when the bayonet closure is produced.

By configuring the opening edge 16 of the receiving opening 9 in the carrier and the flange 15 on the basket at the flange rear side 15*b* thereof, in particular by means of axial centering studs 39 which are provided at that location and which are comparatively clearly visible in FIGS. 5 and 9, during the production of the bayonet closure, in particular during the insertion movement (insertion assembly) of the loudspeaker 4, a self-centering of the loudspeaker 4 or the basket 10 thereof in the receiving opening 9 in the carrier is carried out.

The radially internal sealing lip 13*b* acts as a radial sealing element (in the radial direction R) and also as a centering element during the (insertion) assembly of the loudspeaker 4 or the loudspeaker basket 10 thereof in the receiving opening 9 of the carrier element 2, in particular in the region of the abutment interface 14. The radially external, axially projecting sealing lip 13*a* in the form of a soft sealing component in comparison with the radially internal sealing lip 13*b* acts as an axial sealing element (in an axial direction A) in order to seal the loudspeaker 4 with respect to the carrier element 2 in the region of the abutment interface 14.

In summary, the invention relates to an assembly configuration of a loudspeaker 4, in particular in a vehicle door. To this end, there are provided a carrier element 2 with a receiving opening 9 for the loudspeaker 4 and a loudspeaker basket 10 with a flange 15 and a sealing element 13 in the region of a mechanical abutment interface 14 between the loudspeaker basket 10 and the carrier element 2. During the assembly, the loudspeaker basket 10 engages through the receiving opening 14 in the carrier and the flange 15 on the basket abuts against the carrier element 2 with the sealing element 13 being interposed. In order to produce a bayonet closure or an insertion/rotation joining connection of the or inside the assembly configuration, the loudspeaker basket 10 has a number of joining elements 25, which are in particular arranged on basket struts 23 of the loudspeaker basket 10 and which correspond to joining contours 26 of the carrier element 2.

Additionally or alternatively, at least one ramp 33, which extends in particular in a circumferential direction of the flange 15 on the basket and which is preferably circle-segment-like, for producing a pressing force on the sealing element 13 is provided on the flange 15 on the basket on the flange side 15*b* which faces the abutment interface 14.

Additionally or alternatively, in particular at a lowest location P of the abutment interface 14, there is further provided a water discharge W, which in particular does not have a tank, between the loudspeaker basket 10 and the abutment interface 14 of the receiving opening 9 in the carrier.

Additionally or alternatively, there is further provided in or on a formed member 21 of the carrier element 2 a plug receiving member or leadthrough 22 in such a manner that—preferably according to the poka-yoke principle—contacting via plugs of an external counter-plug 11*a* with a connection plug 11 on the basket or loudspeaker is enabled only when the loudspeaker 4 or the basket 10 thereof is located in the receiving opening 9 in the carrier in a correct desired position or desired location (desired end position).

The claimed invention is not limited to the above-described exemplary embodiments. Instead, other variants of the invention may also be derived by the person skilled in the art therefrom in the context of the disclosed claims without departing from the subject-matter of the claimed invention. In particular, all the individual features which are described in connection with the different exemplary embodiments in the context of the disclosed claims can also further be combined in different manners without departing from the subject-matter of the claimed invention.

The following is a summary list of reference numerals and the corresponding structure used in the above description of the invention.

LIST OF REFERENCE NUMERALS

1 Door module
2 Carrier element
3 Door module carrier plate/internal metal sheet
4 Loudspeaker
5 Guide rail
6 Rail slider/carrier
7 Cable roll
8 Pulling cable
9 Receiving opening
10 Loudspeaker basket
11 Connection plug
11*a* Counter-plug (on cable)
12 Connection cable
13 Sealing element/ring
13*a* External, soft sealing lip
13*b* Internal, hard sealing lip
14 Abutment/connection interface
15 Flange
15*a* Flange wall
15*b* Flange rear side
16 Opening edge
17 Basket base
18 Permanent magnet
19 Loudspeaker membrane
20 Wall
21 Formed member
22 Plug receiving member/leadthrough
23 Basket/wall struts/web
24 Through-opening/basket opening
24' Recess in basket
25 Joining element (on basket)
26 Joining contour/radial flap (on carrier)
27 Engaging cavity/contour
28 Run-in ramp
29 Engaging element/stud
30 Axial web/abutment collar
31 Resilient element
32 Engaging dome
33 Start ramp
34 Cutout/recess (in carrier)
35 Radial strut/flap (in carrier)
36 Recess (in carrier)
37 Engaging cavity
38 Engaging groove
39 Centering stud
A Axial direction
P Lowest location
R Radial direction
W Water discharge
Z Rotation axis

The invention claimed is:

1. An assembly configuration of a loudspeaker in a motor vehicle, the assembly configuration comprising:

a carrier element having a receiving opening formed therein and surrounded by an opening edge for the loudspeaker, said carrier element further having a plurality of joining contours;

a loudspeaker basket having a flange, wall struts, a basket base and at least one ramp;

a sealing element disposed in a region of a mechanical abutment interface between said loudspeaker basket and said opening edge surrounding said receiving opening;

said loudspeaker basket engaging during assembly on said carrier element through said receiving opening in said carrier element, and said flange of said loudspeaker basket abuts against said opening edge surrounding said receiving opening with said sealing element being interposed;

said loudspeaker basket having a plurality of joining elements corresponding to said joining contours of said carrier element in order to produce a bayonet closure; and said at least one ramp extending in a circumferential direction of said flange on said loudspeaker basket, said at least one ramp disposed on said flange of said loudspeaker basket on a flange side facing said opening edge surrounding said receiving opening in said carrier element, in order to produce a pressing force on said sealing element.

2. The assembly configuration according to claim 1, wherein:

said loudspeaker basket is in a form of a pot, wherein said flange forms a flange wall which extends axially and wherein there are provided between said flange wall and said basket base or therein, a hole/web structure with basket openings or through-openings formed therein which extend in a circumferential direction of said loudspeaker basket and are curved or slot-shaped so as to form said wall struts; and/or during the assembly of the loudspeaker on said carrier element, said flange of said loudspeaker basket abuts against said opening edge surrounding said receiving opening of said carrier element with said flange side of said flange which faces said basket base of said loudspeaker basket having said sealing element being interposed.

3. The assembly configuration according to claim 1, wherein:

said at least one of said joining elements of said loudspeaker basket has a claw-shaped hook structure which, during production of said bayonet closure, engages over at least one of said joining contours of said carrier element; and/or said at least one joining contour on said carrier element is in a form of a radial flap which projects into said receiving opening in said carrier element and engages behind or under said at least one joining element on said loudspeaker basket during production of said bayonet closure.

4. The assembly configuration according to claim 1, further comprising a snap-fit connection being formed between at least one of said joining elements on said loudspeaker basket and a corresponding one of said joining contours on said carrier element when said bayonet closure is or becomes produced between said loudspeaker basket and said carrier element.

5. The assembly configuration according to claim 1, wherein at least one of said joining elements on said loudspeaker basket has an engaging contour and at least one of said joining contours on said carrier element has a corresponding engaging element which engages in said engaging contour on said loudspeaker basket, via a run-in ramp, during a production of said bayonet closure between said loudspeaker basket and said carrier element.

6. The assembly configuration according to claim 1, wherein said carrier element has circular-arc-shaped cutouts formed therein between said joining contours on said carrier element in order to receive said joining elements on said loudspeaker basket during an insertion movement during production of said bayonet closure between said loudspeaker basket and said carrier element, and said circular-arc-shaped cutouts in said carrier element provide different circular arc lengths or circle segments so that only one possible insertion position of said loudspeaker basket in said receiving opening in said carrier element is provided for producing said bayonet closure during the insertion movement.

7. The assembly configuration according to claim 1, wherein said sealing element is in a form of a two-component seal.

8. The assembly configuration according to claim 1, wherein said sealing element has two concentric sealing lips, wherein a first of said two concentric sealing lips axially projects over a second of said two concentric sealing lips.

9. The assembly configuration according to claim 8, wherein said first of said two concentric sealing lips is a radially external sealing lip.

10. The assembly configuration according to claim 1, wherein said at least one ramp is disposed in a region of said mechanical abutment interface between said receiving opening in said carrier element and said sealing element.

11. The assembly configuration according to claim 1, wherein said at least one ramp is disposed upstream of a respective one of said joining elements on said loudspeaker basket in such a manner that, during a rotational movement of said loudspeaker basket with respect to said carrier element in the region of said mechanical abutment interface, initially a reduced sealing pressure is produced and, during a further rotational movement of said loudspeaker basket during a joining operation, an increasing pressing pressure is produced on said sealing element.

12. The assembly configuration according to claim 11, wherein said at least one ramp is axially declining in a direction of the rotational movement of said loudspeaker basket.

13. The assembly configuration according to claim 11, wherein with an increasing rotational movement of said loudspeaker basket a respective one of said joining contours on said carrier element is guided along said at least one ramp in order, during the joining connection for producing said bayonet closure, to engage behind said respective joining element on said loudspeaker basket so as to generate the pressing pressure on said sealing element.

14. The assembly configuration according to claim 13, wherein said respective one of said joining contours of said carrier element is in a form of a radial or joining flap.

15. The assembly configuration according to claim 1, wherein:

at said flange on said loudspeaker basket, a connection plug of the loudspeaker is disposed; and said the carrier element has a recess adapted to the connection plug, wherein, as a technical precaution for insertion contacting, which avoids an assembly error, of a counter-plug with respect to the connection plug on the loudspeaker or said loudspeaker basket, it is aligned with said recess in said carrier element only in one desired end position of said loudspeaker basket in said receiving opening in said carrier element.

16. The assembly configuration according to claim 1, wherein:

at a lowest location in an installation state of the loudspeaker or said loudspeaker basket or at a position or location which is provided vertically as low down as possible a circle segment of said mechanical abutment interface between said loudspeaker basket and said opening edge surrounding said receiving opening in a radial direction is configured in a reduced manner; and/or at said opening edge surrounding said receiving opening in said carrier element, said carrier element has a circle-segment-shaped recess formed therein; and/or on said flange on said loudspeaker basket a further circle-segment-shaped recess is formed thereon; and/or said circle-segment-shaped recess in said carrier element is aligned with said further circle-segment-shaped recess in said loudspeaker basket in a region of said mechanical abutment interface; and/or said sealing element has a radially internal circle-segment-shaped circumferential region being aligned with said circle-segment-shaped recess in said carrier element and/or with said circle-segment-shaped recess in said loudspeaker basket.

17. The assembly configuration according to claim 1, wherein:

the loudspeaker is configured for fitting in a vehicle door of the motor vehicle;

said plurality of joining elements are disposed on said wall struts; and said at least one ramp is circular-arc-shaped.

18. A door module of a motor vehicle door, comprising:

the assembly configuration according to claim 1.

19. An assembly configuration of a loudspeaker in a motor vehicle, the assembly configuration comprising:

a carrier element having a receiving opening formed therein and surrounded by an opening edge for the loudspeaker;

a loudspeaker basket having an annular flange, wall struts and a basket base;

a sealing element disposed in a region of a mechanical abutment interface between said loudspeaker basket and said opening edge surrounding said receiving opening;

said loudspeaker basket engages during assembly on said carrier element through said receiving opening in said carrier element, and said flange of said loudspeaker basket abuts against said opening edge surrounding said receiving opening with said sealing element being interposed; and wherein, at a lowest location of said mechanical abutment interface, between said loudspeaker basket and said opening edge surrounding said receiving opening in said carrier element, a water discharge is provided.

20. The assembly configuration according to claim 19, wherein at said lowest location of said mechanical abutment interface, between said loudspeaker basket and said opening edge surrounding said receiving opening in said carrier element, the water discharge is provided without a tank.

* * * * *